US011268436B2

(12) United States Patent
Krausche et al.

(10) Patent No.: US 11,268,436 B2
(45) Date of Patent: Mar. 8, 2022

(54) METHOD AND VEHICLE SYSTEM USING SUCH METHOD

(71) Applicant: Volvo Truck Corporation, Gothenburg (SE)

(72) Inventors: Sebastian Krausche, Höllviken (SE); Martin Bauer, Anderslöv (SE)

(73) Assignee: Volvo Truck Corporation, Gothenburg (SE)

( * ) Notice: Subject to any disclaimer, the term of this patent is extended or adjusted under 35 U.S.C. 154(b) by 48 days.

(21) Appl. No.: 16/616,737

(22) PCT Filed: May 31, 2017

(86) PCT No.: PCT/EP2017/063151
§ 371 (c)(1),
(2) Date: Nov. 25, 2019

(87) PCT Pub. No.: WO2018/219449
PCT Pub. Date: Dec. 6, 2018

(65) Prior Publication Data
US 2021/0148280 A1    May 20, 2021

(51) Int. Cl.
*F02B 37/24* (2006.01)
*F02D 41/00* (2006.01)
(Continued)

(52) U.S. Cl.
CPC ......... *F02B 37/24* (2013.01); *F02D 41/0007* (2013.01); *F02D 41/10* (2013.01);
(Continued)

(58) Field of Classification Search
CPC .... F02B 37/24; F02B 37/225; F02D 41/0007; F02D 41/10; F05D 2220/40; F05D 2250/51
See application file for complete search history.

(56) References Cited

U.S. PATENT DOCUMENTS 4,471,616 A     9/1984   Boudy
5,025,629 A  *  6/1991   Woollenweber .......... F02C 6/12
                                                    60/600
(Continued)

FOREIGN PATENT DOCUMENTS

CN       101446229 A    6/2009
FR          2915237 A1  10/2008
(Continued)

OTHER PUBLICATIONS

FR2915237 Translation; Laurent Fontvielle; Oct. 24, 2008.*
(Continued)

*Primary Examiner* — Jesse S Bogue
(74) *Attorney, Agent, or Firm* — Withrow & Terranova, PLLC (57) ABSTRACT

The invention relates to a method of controlling transient behaviour of an internal combustion engine (10) being provided with a turbocharger (110) and a variable inlet guide vanes assembly (130) arranged upstream a compressor (120) of the turbocharger (110). The method comprises determining a current operational condition indicative of transient behaviour, and, if said transient behaviour requires compressor acceleration: determining a desired operational condition of the compressor (120), and controlling the position of the variable inlet guide vanes assembly (130) based on the desired operational condition of the compressor (120).

13 Claims, 5 Drawing Sheets

(51) Int. Cl.
*F02D 41/10* (2006.01)
*F02B 37/22* (2006.01)
(52) U.S. Cl.
CPC ........ *F02B 37/225* (2013.01); *F05D 2220/40* (2013.01); *F05D 2250/51* (2013.01)

(56) References Cited

U.S. PATENT DOCUMENTS

| | | | | |
|---|---|---|---|---|
| 5,560,208 | A * | 10/1996 | Halimi | F02B 37/10 60/608 |
| 6,079,211 | A * | 6/2000 | Woollenweber | F02B 37/025 60/612 |
| 6,256,993 | B1 * | 7/2001 | Halimi | F02B 39/10 60/608 |
| 6,298,718 | B1 * | 10/2001 | Wang | F02D 41/22 73/114.01 |
| 6,994,518 | B2 * | 2/2006 | Simon | F01D 17/162 415/147 |
| 7,669,417 | B2 * | 3/2010 | Smith | F02B 29/0443 60/599 |
| 8,375,714 | B2 * | 2/2013 | Gokhale | F02B 37/225 60/611 |
| 9,194,284 | B2 * | 11/2015 | Gratton | F02B 47/08 |
| 2004/0096316 | A1 | 5/2004 | Simon et al. | |
| 2008/0127644 | A1 | 6/2008 | Codan et al. | |
| 2009/0013687 | A1 * | 1/2009 | Swenson | F02D 23/00 60/600 |
| 2009/0013689 | A1 | 1/2009 | Sumser et al. | |
| 2009/0249783 | A1 * | 10/2009 | Gokhale | F02D 41/005 60/602 |
| 2013/0152580 | A1 | 6/2013 | Marx et al. | |
| 2015/0143882 | A1 * | 5/2015 | Nakano | F02B 39/16 73/112.05 |

FOREIGN PATENT DOCUMENTS

| | | |
|---|---|---|
| GB | 2425332 A | 10/2006 |
| JP | S56148619 A | 11/1981 |
| JP | S62253924 S | 11/1987 |

OTHER PUBLICATIONS

International Preliminary Report on Patentability for International Patent Application No. PCT/EP2017/063151, dated Sep. 5, 2019, 7 pages.

International Search Report and Written Opinion for International Patent Application No. PCT/EP2017/063151, dated Feb. 13, 2018, 13 pages.

First Office Action for Chinese Patent Application No. 201780091396.7, dated Aug. 11, 2021, 19 pages.

* cited by examiner

METHOD AND VEHICLE SYSTEM USING SUCH METHOD

This application is a 35 USC 371 national phase filing of International Application No. PCT/EP2017/063151, filed May 31, 2017, the disclosure of which is incorporated herein by reference in its entirety.

TECHNICAL FIELD

The invention relates to a method and a vehicle system using such method. More particularly the present invention relates to a method and vehicle system for controlling transient behaviour during driving.

The invention can be applied in heavy-duty vehicles, such as trucks, buses and construction equipment. Although the invention will be described with respect to a truck, the invention is not restricted to this particular vehicle, but may also be used in other applications.

BACKGROUND

Heavy-duty vehicles, such as trucks, are typically driven by a diesel engine having a turbocharger connected thereto. In developing improved vehicles of this type there is a constant increase of more stringent requirements for fuel efficiency, emissions, and power/torque. Especially for vehicle systems including a turbocharger these requirements normally drives towards a vehicle system being highly optimized with relatively low margin to its design limits. Also, the transient response is normally compromised with.

The above prerequisites often result in that the turbocharger is provided with a fuel optimized turbine size with high efficiency and therefore a larger swallowing capacity for the same boost level, and a larger turbine and compressor diameter for optimal efficiency based on well-known low specific speed efficiency optimization, i.e. a great challenge for transient response. This is especially the case for engines provided with a fix geometry turbocharger, allowing for only limited possibilities to adjust or vary the turbine swallowing capacity by means a waste gate for optimal transient response times.

US2004096316 describes a turbocharger for a passenger car. Due to the comparatively broad operating range of engine speeds and load of small cars the turbocharger is modified in order to enhance the performance by selectively generating either positive or negative pre-whirl of supply air to the compressor. For this, a variable inlet guide vanes assembly is arranged upstream the compressor. By controlling the pre-whirl it is possible to improve the efficiency of the compressor.

For larger engines, such as those used for trucks and other heavy-duty vehicles, transient response is a critical parameter of engine performance. Considering a turbocharger, mainly three key parameters influence the transient response namely efficiency, swallowing capacity and turbocharger speed. The main challenge to reduce transient response time normally occurs at low engine load at which the turbocharger speed is low and hence takes some time to accelerate to give sufficient boost pressure for satisfactory fuel injection. It should be noted that it will not be possible to inject more fuel in an engine than the available amount of air permits to fulfil emission requirements; there are also other relevant limits affected by the amount of air, such as temperatures etc.

Therefore it would be desirable to provide a method and vehicle system capable of optimizing transient response times, especially for commercial vehicles.

SUMMARY

An object of the invention is to provide a method and vehicle system allowing for changing compressor characteristics in order to improve transient behaviour.

According to a first aspect of the invention, the object is achieved by a method. According to a second aspect of the invention, the object is achieved by a vehicle system.

By controlling the position of a variable inlet guide vanes assembly based on a desired operational condition of the compressor it is possible to change compressor characteristics such that transient behaviour is improved.

According to an embodiment the current operational condition indicative of transient behaviour is performed by detecting a change from low load to high load. When detecting such change, the method may automatically change compressor characteristics such that the transient response time is reduced.

In an embodiment the desired operational condition of the compressor corresponds to higher compressor speed. Hence, as the compressor may reach a higher speed more rapid the transient behaviour is improved.

In an embodiment the desired operational condition of the compressor corresponds to increased compressor efficiency. Thereby improved boost is achieved, which may result in a corresponding increase of compressor speed.

In an embodiment, controlling the position of the variable inlet guide vanes assembly is performed by determining an estimated positive inclination angle of the vanes of the variable inlet guide vanes assembly, and changing the inclination of the vanes to the determined positive inclination angle. Hence the pre-whirl of the air is adjusted to change compressor characteristics. The estimated positive inclination angle of the vanes may be between 0 and 45°, preferably between 0 and 20°.

Preferably, changing the inclination angle of the vanes will also change the flow inlet angle of the compressor. In some embodiments the inclination angle of the vanes is controlled to be within ±45°, while in other embodiment the flow inlet angle of the compressor is controlled (by changing the inclination angle of the vanes) to be within ±45°.

In an embodiment determining the desired operational condition of the compressor and controlling the position of the variable inlet guide vanes assembly are repeated. By doing so the optimal angle of the variable inlet guide vanes assembly can be adjusted continuously during a full transient from low to high load at a given, or varying, engine speed.

In an embodiment, determining a desired operational condition of the compressor corresponding to higher compressor speed, and controlling the position of the variable inlet guide vanes assembly based on the desired operational condition of the compressor, is followed by determining a desired operational condition of the compressor corresponding to higher compressor efficiency, and controlling the position of the variable inlet guide vanes assembly based on the desired operational condition of the compressor. As the compressor efficiency increases, it is possible to increase the amount of fuel during the transient in order to reach the requested torque level faster.

In an embodiment the method further comprises determining a current operational condition of the compressor indicative of a required compressor deceleration, and controlling the position of the variable inlet guide vanes assembly based on the current operational condition of the compressor. If the compressor acceleration is too high it will be possible to reduce the risk of speed over shoots.

Consequently, in an embodiment the method performs determining a current operational condition of the compressor by determining compressor speed over shooting.

In an embodiment, controlling the position of the variable inlet guide vanes assembly based on the current operational condition of the compressor is performed by determining an estimated negative inclination angle of the vanes of the variable inlet guide vanes assembly, and changing the inclination of the vanes to the determined negative inclination angle. Hence the pre-whirl of the air is adjusted to change compressor characteristics. The estimated negative inclination angle of the vanes may be between 0 and 45°, preferably between 0 and 20°.

In an embodiment detecting a current operational condition of the compressor is performed by determining the current corrected mass flow through the compressor and the current pressure ratio across the compressor, and determining a current operating point in a compressor map. Compressor characteristics may thus be determined in a reliable and robust manner.

In an embodiment determining a desired operational condition of the compressor comprises identifying a current operating point in a compressor map, and determining a desired operating point based on the current operating point. Also in this case compressor characteristics may be determined in a reliable and robust manner.

According to a further aspect a computer program comprising program code means for performing the steps of the method according to the first aspect is provided, when said program is run on a computer.

According to a yet further aspect a computer readable medium is provided, carrying a computer program comprising program code means for performing the steps of the method according to the first aspect when said program product is run on a computer.

According to a second aspect a vehicle system is provided. The vehicle system comprises an internal combustion engine, a turbocharger, a variable inlet guide vanes assembly arranged upstream a compressor of the turbocharger, and a control unit being connected to the variable inlet guide vanes assembly. The control unit is configured to determine a current operational condition indicative of transient behaviour, and, if said transient behaviour requires compressor acceleration, determine a desired operational condition of the compressor, and control the position of the variable inlet guide vanes assembly based on the desired operational condition of the compressor.

In an embodiment the control unit is configured to determine the current operational condition indicative of transient behaviour by detecting a change from low load to high load.

In an embodiment the desired operational condition of the compressor corresponds to higher compressor speed.

In an embodiment the desired operational condition of the compressor corresponds to increased compressor efficiency.

In an embodiment the control unit is configured to control the position of the variable inlet guide vanes assembly by determining an estimated positive inclination angle of the vanes of the variable inlet guide vanes assembly, and change the inclination of the vanes to the determined positive inclination angle.

In an embodiment the estimated positive inclination angle of the vanes is between 0 and 45°, preferably between 0 and 20°.

In an embodiment the control unit is configured to repeat determining a desired operational condition of the compressor and controlling the position of the variable inlet guide vanes assembly.

In an embodiment the control unit is further configured to determine a current operational condition of the compressor, and to control the position of the variable inlet guide vanes assembly based on the current operational condition of the compressor.

In an embodiment the control unit is configured to determine a current operational condition of the compressor by determining acceleration of the compressor.

In an embodiment the control unit is further configured to control the position of the variable inlet guide vanes assembly based on the current operational condition of the compressor by determining an estimated negative inclination angle of the vanes of the variable inlet guide vanes assembly, and changing the inclination of the vanes to the determined negative inclination angle.

In an embodiment the control unit is configured to perform the steps of the method according to the first aspect.

According to a yet further aspect, a vehicle is provided comprising a vehicle system according to the second aspect.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
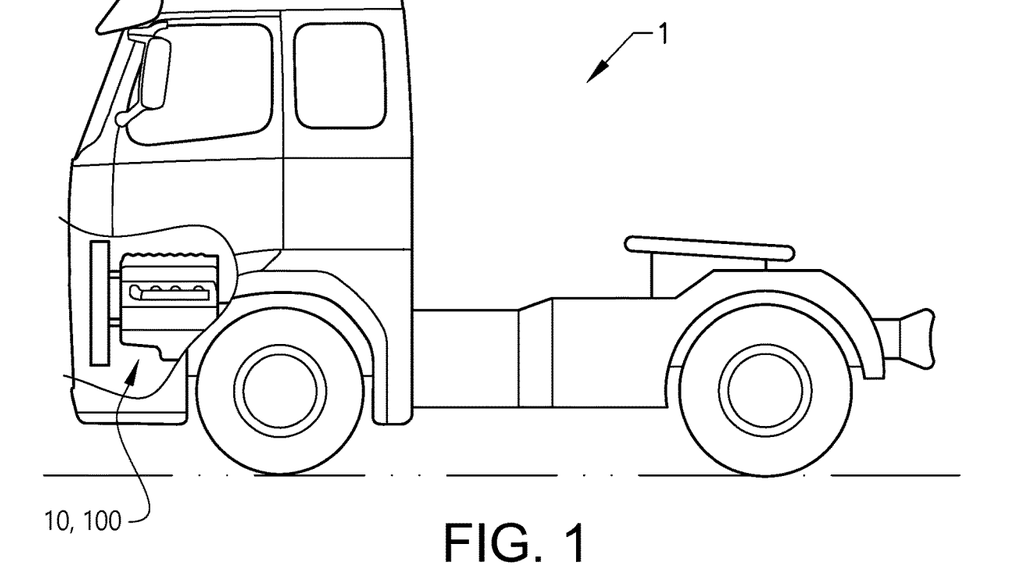
FIG. 1 is a schematic view of a truck being equipped with a vehicle system according to an embodiment.

Starting in FIG. 1 a vehicle 1 is shown, here in the form of a truck. The truck 1 is driven by means of an internal combustion engine 10 forming part of a vehicle system 100 which is shown in further details in FIG. 2.

Figure 2:
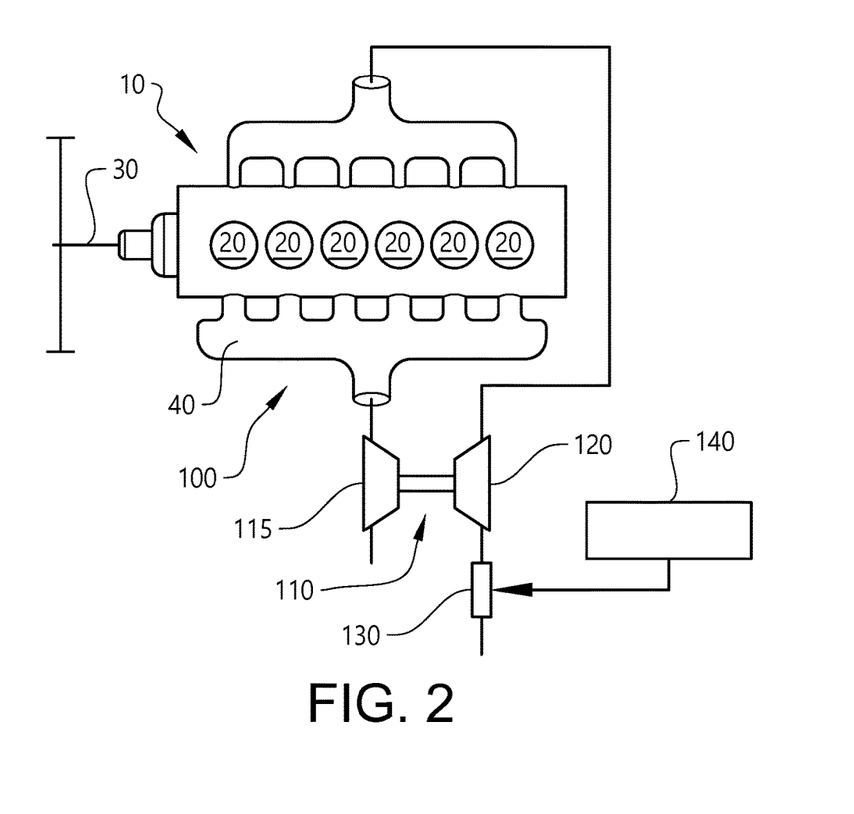
FIG. 2 is a schematic view of a vehicle system according to an embodiment.

As can be seen in FIG. 2 the internal combustion engine 10, such as a diesel engine, has a plurality of cylinders 20. Driving torque is generated by the reciprocal movement of pistons (not shown) enclosed in the cylinders 20, said pistons being connected to a crank shaft 30. As is well known in the art the crank shaft 30 is in turn coupled to a transmission.

A turbocharger 110 is also forming part of the vehicle system 100. The turbocharger 110 has a turbine 115 receiving exhaust gases from a manifold 40, which thereby starts to rotate. The turbine 115 is rotationally coupled to a compressor 120 which is receiving intake air and compresses the air before the air enters the cylinders 20.

The turbocharger 110 may be a fixed geometry turbocharger, which means that there is no possibility to adjust the swallowing capacity of the turbine 115. However, the turbocharger 110 may in some embodiments also be a variable geometry turbocharger.

A variable inlet guide vanes assembly 130 is arranged upstream the compressor 120 of the turbocharger 110. Hence fresh intake air flowing towards the compressor 120 will need to pass the variable inlet guide vanes assembly before entering the compressor 120.

Figure 3A:
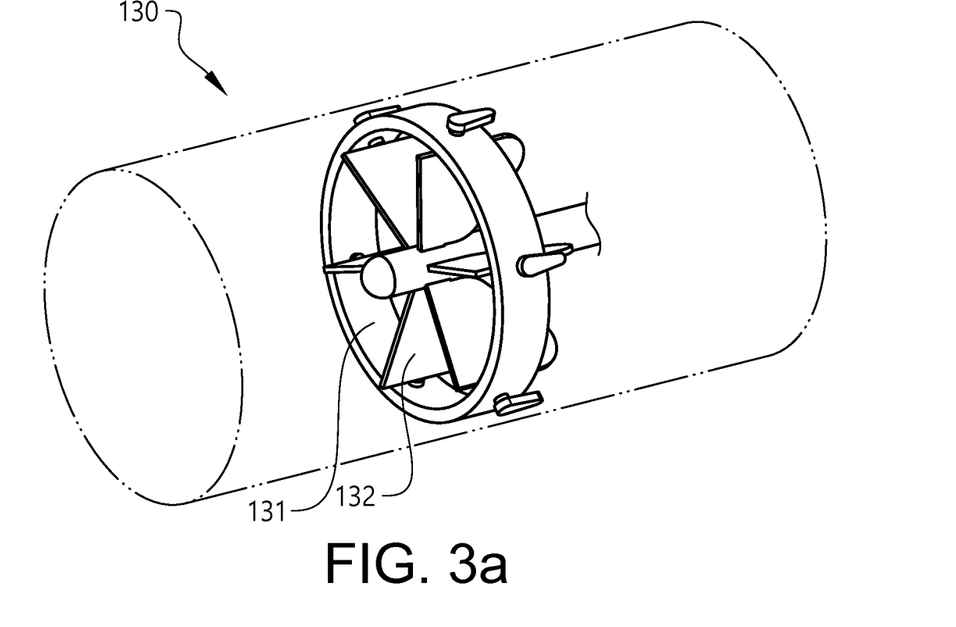
FIGS. 3*a-d* are views of a variable inlet guide vanes assembly forming part of a vehicle system according to an embodiment.
Figure 3B:
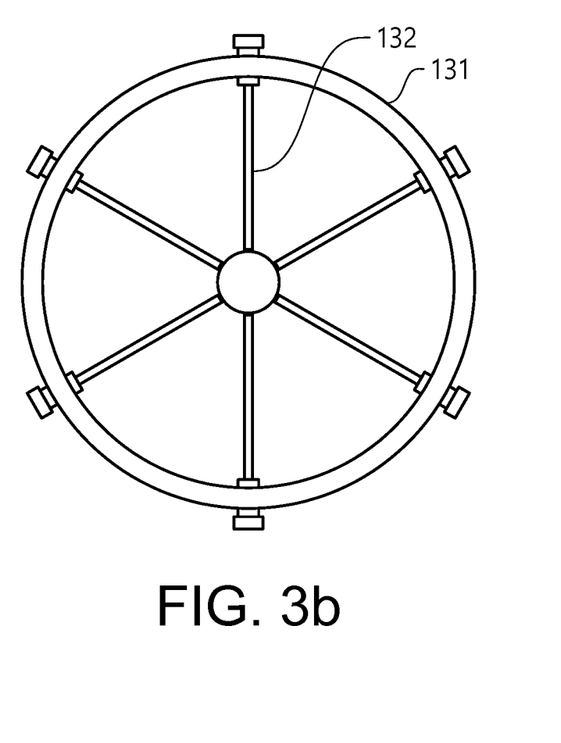
Figure 3C:
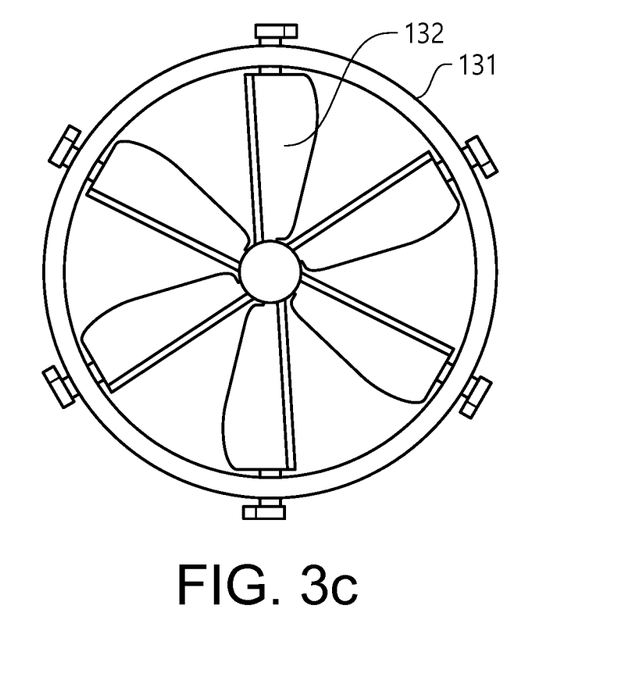
Figure 3D:
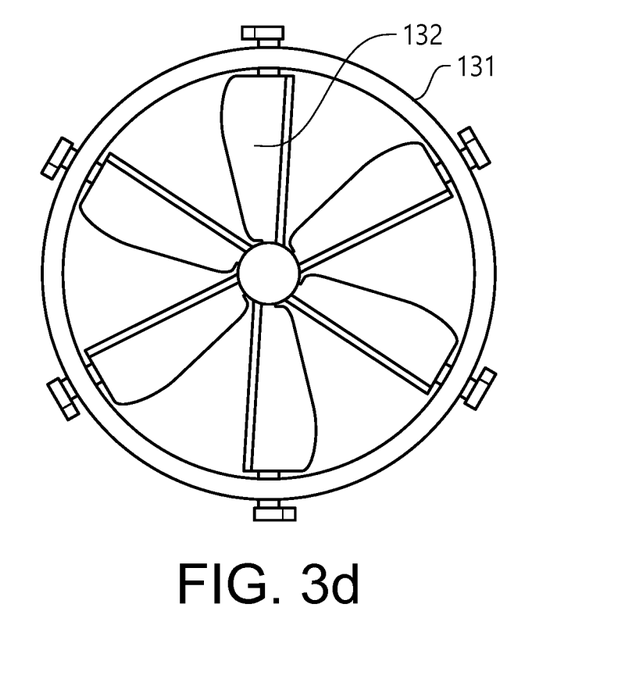

An example of a variable inlet guide vanes assembly 130 for use within the context of the present application is shown in FIGS. 3a-d. The variable inlet guide vanes assembly 130 comprises a flow channel 131 in which a number of vanes 132 is arranged. The number of vanes 132 could be selected depending on various criteria, and the present disclosure is not limited to the specific number of vanes 132 taught by FIGS. 3a-d. The position of the vanes 132 can be controlled by means of an actuator (not shown) being connected to a control unit 140 (see FIG. 2). Upon actuation the angle of the vanes 132 will be changed, either in a positive direction as is shown in FIG. 3c, or in a negative direction as is shown in FIG. 3d. As is readily understood the inclination angle of the vanes 132, which is equal for all vanes 132, can be set continuously and with a very high precision. It should further be noted that a neutral position, i.e. an inclination angle of 0°, corresponds to a position in which the vanes 132 cause minimum change in flow characteristics (see FIG. 3b).

The variable inlet guide vanes assembly 130 can be used to determine the angle of the inlet flow to the centrifugal compressor 120, i.e. modify the so called inlet velocity triangle, in order to extend the stable operating range by reducing or increasing the aerodynamic loading. A small to moderate pre-whirl in the same direction as the compressor 120 rotates (i.e. effected by means of a positive inclination angle of the vanes 132) reduces the loading which in turn results in reduced pressure ratio but, at the same time, improved isentropic efficiency towards the low flow region of a corresponding compressor map. A small pre-whirl in the opposite direction (i.e. effected by means of a negative inclination angle of the vanes 132) results in an increased loading which leads to a higher pressure ratio, especially towards the high flow region of the corresponding compressor map. It has been shown that some improvement of isentropic efficiency can be achieved in this high flow region but for the main part of the compressor map the efficiency decreases.

As will be further described with reference to FIG. 4, control of the inclination angle of the vanes 132 will in fact assist in improving the transient behaviour of the entire vehicle system 100.

Figure 4:
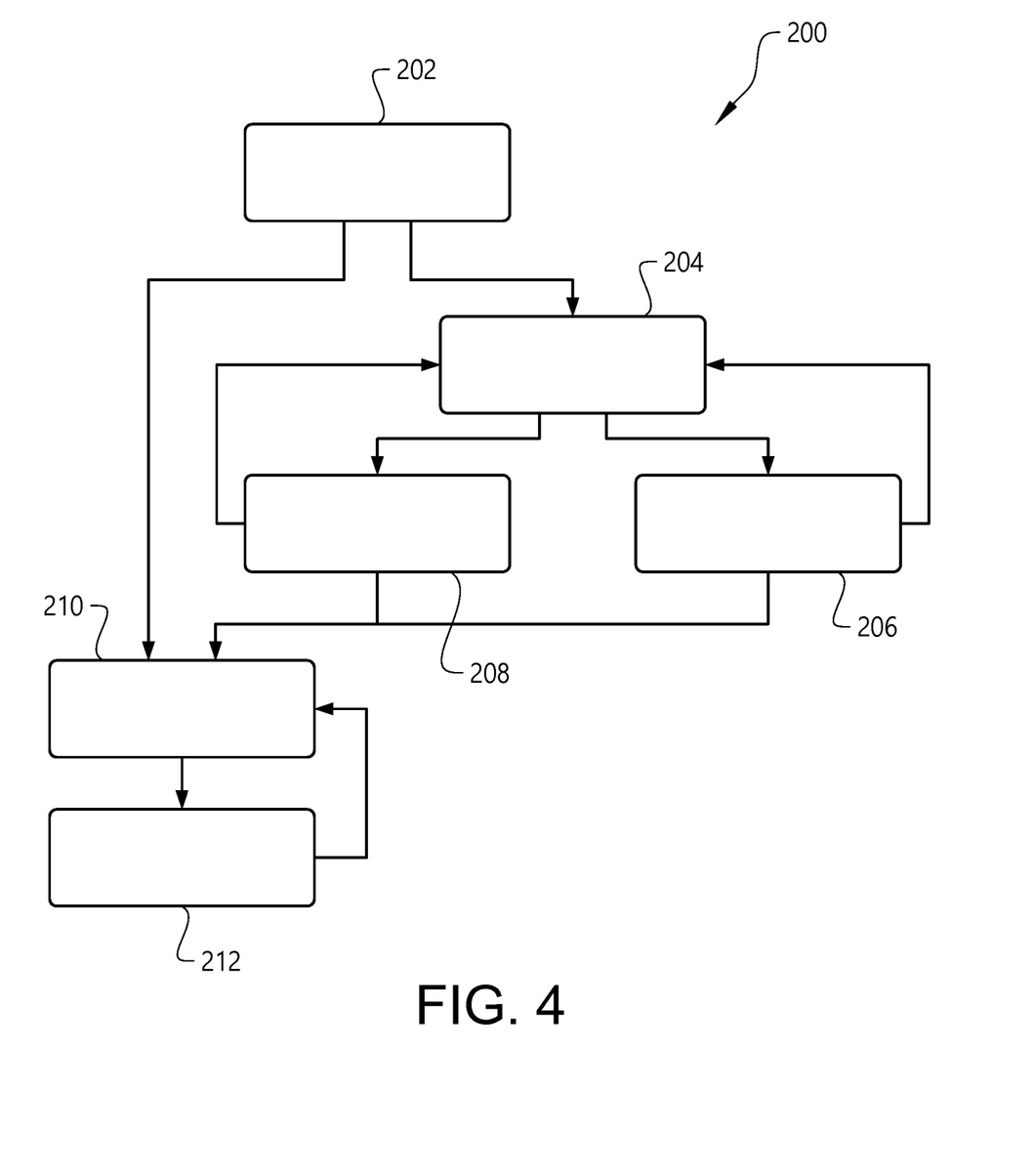
FIG. 4 is a schematic view of a method according to an embodiment.

Now turning to FIG. 4 a method 200 for improving transient behaviour is shown. The method 200 is performed using a vehicle system 100 as described above, i.e. the transient behaviour is adjusted by controlling the inclination angle of the vanes 132 of the variable inlet guide vanes assembly 130.

As a general principle, the suggested method 200 is performed in order to minimize the response time by using a variable inlet guide vanes assembly 130 to increase the acceleration of the turbo speed and hence boost pressure as well as available amount of air by varying the inclination angle of the vanes 132 of the variable inlet guide vanes assembly 130.

Different inclination angles of the vanes 132 will influence the compressor characteristics in terms of map width, efficiency and turbo speed differently based on where in the map the operating point is located as will be explained later with reference to FIGS. 5 and 6. Moreover, different effects on the compressor maps are seen depending on negative or positive inclination angles of the vanes 132.

As will be understood optimal combinations of engine settings such as fuel injection timing, position of an exhaust gas recirculation valve, the wastegate position, the position of the variable geometry turbine, etc. can also be determined for achieving optimal transient response times based on the effect compressor speed lines and efficiency have on the system.

In a first step 202 the method 200 detects if the vehicle system 100 is in a transient operational condition. Such detection may typically be performed by determining a load increase transient event, e.g. when changing from low load to high load for a specific engine speed. After such determination it is important to allow the compressor 120 to accelerate as fast as possible. At low load the compressor speed is normally very low and hence takes time to accelerate due to wheel inertia and lack of available exhaust energy. Also dependent on engine speed, the operating point in the compressor map is located differently in x-axis where the speed lines normally drops closer to choke.

When it has been determined that acceleration of the compressor 120 is required, a step 204 is performed in which the optimal positive inclination angle of the variable inlet guide vanes assembly 130 is determined. With reference in the current operating point in the compressor map a positive inclination angle of the vanes 132 of the variable inlet guide vanes assembly 130 is selected, providing for a change of compressor characteristics resulting in a speed increase of the compressor 120.

Step 204 may further comprise identifying the optimal wastegate or variable geometry turbine position (if available) based on e.g. turbo speed, exhaust temp, ambient pressure, boost pressure, the position of the exhaust gas recirculation valve (if available) and brake specific fuel consumption using physical or numerical speed sensor and the already existing sensors on the engine.

From step 204 the method 200 may take any one of two different routes. The method 200 may proceed to a step 206 of changing the inclination angle of the vanes 132 of the variable inlet guide vanes assembly 130 in order to increase the compressor speed. Considering the compressor map, this is done by moving the speed lines down relative an equivalent map point resulting in a higher physical turbo speed.

Figure 5:
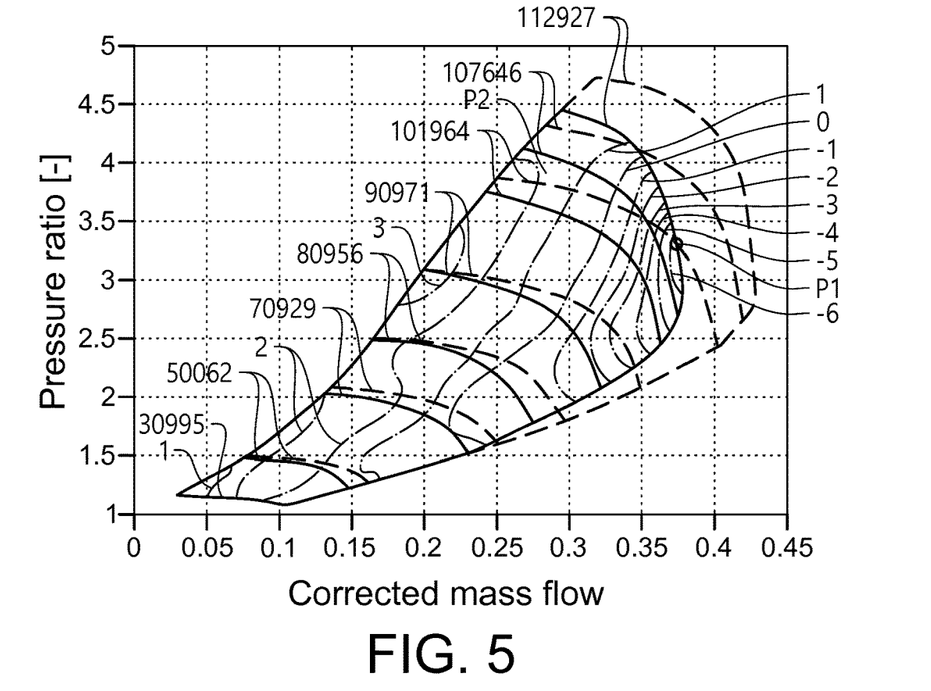
FIG. 5 is a diagram showing a compressor map when the variable inlet guide vanes assembly is in a neutral position, as well as in a positively inclined position.

Turning to FIG. 5, an example of a compressor map is shown for two different inclination angles of the vanes 132 of the variable inlet guide vanes assembly 130. In FIG. 5 as well as in FIG. 6 the iso islands represent the delta efficiency in relation to a neutral compressor map. The dashed lines correspond to a neutral position of the vanes 132, i.e. 0°, while the solid lines correspond to an inclination angle of +20°, i.e. a positive inclination angle. Other positive inclination angles between 0° and +20° and/or even higher inclination angles will give different variation of the speed lines and efficiency levels. This means that different combinations of inclination angle, engine settings, wastegate settings (or variable geometry turbine settings) will provide efficient means for optimizing the transient behaviour.

Figure 6:
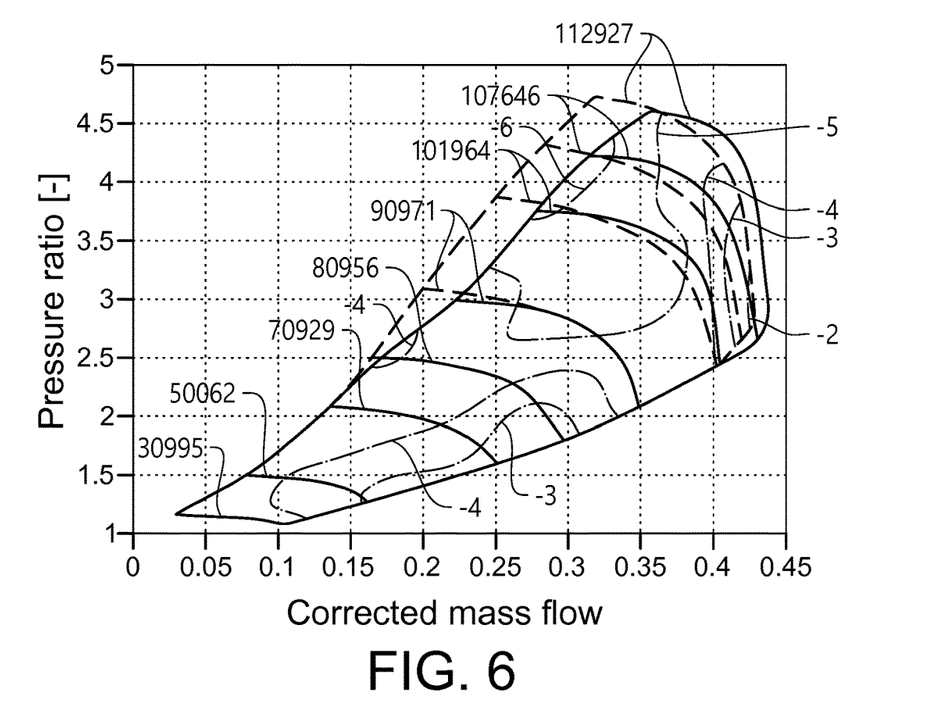
FIG. 6 is a diagram showing a compressor map when the variable inlet guide vanes assembly is in the neutral position, as well as in a negatively inclined position

The diagrams of FIGS. 5 and 6 show experimental data, i.e. measured values mapped to show the effect different inclination angles of the vanes 132 of the variable inlet guide vane assembly 130 has on the compressor map. This data has been used to extrapolate turbo compressor maps, where two examples of maps with different inclination angles are exemplified (−20 and +20 deg). By knowing the compressor map for specific inclination angles, it is possible to determine a most suitable compressor map to improve transient behaviour, and to change the inclination angle of the vanes 132 such that the selected compressor map is applied.

From step 204 the method 200 may also take a different route, by proceeding to a step 208 of changing the inclination angle of the vanes 132 of the variable inlet guide vanes assembly 130 in order to increase the compressor efficiency. Considering the compressor map, this is done by moving the "efficiency islands" relative an equivalent map point resulting in a higher physical turbo speed.

In principle both the "efficiency islands" and the turbo speed lines can be moved by controlling the vanes 132 of the variable inlet guide vanes assembly 130.

Again returning to FIG. 5, it is clearly visible that the compressor speed will increase quite significantly for the positive inclination angle (as well as intermediate inclination angles between 0° and +20°) both by moving the speed lines and by increasing the compressor efficiency. This provides an opportunity to increase the amount of fuel during the transient to reach the requested torque level quicker.

From FIG. 5 it is also visible that the compressor efficiency cannot be increased in all operating points (especially indicated at high pressure ratios and flows), but due to the significant increase in compressor speed in this region from the relative movement of the speed lines there is still room for optimization of the transient behaviour. For example, a current operating point during a transient behaviour may be located at P1. When the inclination angle is 0° the compressor characteristics are given by the dashed lines of the compressor map. In P1, the compressor speed is 101964 rpm as the operating point P1 is arranged on the speed line corresponding to this value. However, if the inclination angle is changed to e.g. +20° the compressor map will change accordingly to the map represented by solid lines in FIG. 5. As is evident from this diagram the speed lines have shifted and the operating point P1 is now located on the speed line corresponding to a compressor speed of 112929 rpm. By controlling the variable inlet guide vanes assembly 130 the compressor speed may be increased, thus improving the transient behaviour.

As indicated in FIG. 4 the steps 204-206 and steps 204-208 can be repeated while moving through the transient condition. Notably, the movement of the speed lines giving higher turbo speed in itself does not give increased pressure boost which means that the method 200 is preferably performed in a following manner; first steps 204 and 206 are performed, optionally being repeated for a number of times such that inclination angles of the vanes 132 are set to increase the physical speed. Thereafter steps 204 and 208 are performed, repeated if necessary, such that inclination angles are selected giving higher efficiency for optimal boost pressure/air/fuel increase.

Also for so called compressor speed "over shoots" coming from a quick compressor speed acceleration together with a relatively high inertia of the wheel, the variable inlet guide vanes assembly 130 can be used to reduce these "over shoots" basically by adjusting the inclination angle of the vanes 132 at the end of the transient by a combination of lower compressor efficiency and speed. In FIG. 4, this is represented by method steps 210 and 212.

In step 210 an optimal negative inclination angle of the vanes 132 of the variable inlet guide vanes assembly 130 is determined. Step 210 may either be followed immediately after step 202, or after any one of steps 206 and 208. As indicated in FIG. 6 negative inclination angles have proven to provide more margin at high power, as indicated by the top right side in the map. Also for steps 210 and 212, these may be repeated to dynamically change the inclination angle and thereby improving the transient behaviour.

Further to what has been described above the use of dynamic control of a variable inlet guide vanes assembly 130 to improve transient behaviour could also include a predictive control. More specific, it is possible to improve the overall transient response by imposing a positive pre-whirl inclination angle to be "prepared" for a coming transient by giving the compressor an increased physical speed without affecting its pressure ratio It is to be understood that the present invention is not limited to the embodiments described above and illustrated in the drawings; rather, the skilled person will recognize that many changes and modifications may be made within the scope of the appended claims.

The invention claimed is:

1. A method of controlling transient behaviour of an internal combustion engine being provided with a turbocharger and a variable inlet guide vanes assembly arranged upstream from a compressor housing of a compressor of the turbocharger, the method comprising:
determining a current operational condition indicative of transient behaviour, and, if the transient behaviour requires compressor acceleration:
determining a desired operational condition of the compressor by determining a most suitable compressor map to improve the transient behaviour, the desired operational condition of the compressor corresponding to higher compressor speed, the compressor map being associated with a specific inclination angle of the variable inlet guide vanes assembly moveable between a positive inclination angle and a negative inclination angle, the specific inclination angle being either the positive inclination angle, generating a pre-whirl in a same direction as the compressor, or the negative inclination angle, generating a pre-whirl in an opposite direction, and
controlling the position of the variable inlet guide vanes assembly based on the desired operational condition of the compressor by determining an estimated positive inclination angle of the vanes of the variable inlet guide vanes assembly and changing the inclination angle of the vanes to the determined positive inclination angle such that the compressor map is applied.

2. The method of claim 1, wherein determining the current operational condition indicative of transient behaviour is performed by detecting a change from low load to high load.

3. The method of claim 1, wherein the desired operational condition of the compressor corresponds to increased compressor efficiency.

4. The method of claim 1, wherein the estimated positive inclination angle of the vanes is between 0° and 45°.

5. The method of claim 1, wherein determining a desired operational condition of the compressor and controlling the position of the variable inlet guide vanes assembly are repeated.

6. The method of claim 5, wherein determining a desired operational condition of the compressor corresponding to higher compressor speed, and controlling the position of the variable inlet guide vanes assembly based on the desired operational condition of the compressor, is followed by determining a desired operational condition of the compressor corresponding to higher compressor efficiency, and controlling the position of the variable inlet guide vanes assembly based on the desired operational condition of the compressor.

7. The method of claim 1, wherein determining a current operational condition of the compressor comprises determining compressor speed over shooting.

8. The method of claim 1, wherein detecting a current operational condition of the compressor is performed by determining a current corrected mass flow through the compressor and a current pressure ratio across the compressor and determining a current operating point in a compressor map.

9. The method of claim 1, wherein determining a desired operational condition of the compressor comprises identifying a current operating point in a compressor map and determining a desired operating point based on the current operating point.

10. The method of claim 1 wherein control is performed by a computer program comprising program code means and wherein the computer program is run on a computer.

11. The method of claim 10 wherein the computer program is carried on a computer readable medium.

12. A vehicle system comprising an internal combustion engine, a turbocharger, a variable inlet guide vanes assembly arranged upstream from a compressor housing of a compressor of the turbocharger, and a control unit connected to the variable inlet guide vanes assembly and configured to:
determine a current operational condition indicative of transient behaviour, and, if the transient behaviour requires compressor acceleration,
determine a desired operational condition of the compressor by determining a most suitable compressor map to improve the transient behaviour, the desired operational condition of the compressor corresponding to higher compressor speed, the compressor map being associated with a specific inclination angle of the variable inlet guide vanes assembly moveable between a positive inclination angle and a negative inclination angle, the specific inclination angle being either the positive inclination angle, generating a pre-whirl in a same direction as the compressor, or the negative inclination angle, generating a pre-whirl in an opposite direction, and
control the position of the variable inlet guide vanes assembly based on the desired operational condition of the compressor by determining an estimated positive inclination angle of the vanes of the variable inlet guide vanes assembly and changing the inclination angle of the vanes to the determined positive inclination angle such that the compressor map is applied.

13. A method of controlling transient behaviour of an internal combustion engine being provided with a turbocharger and a variable inlet guide vanes assembly arranged upstream from a compressor housing of a compressor of the turbocharger, the method comprising:
determining a current operational condition indicative of transient behaviour, and, if the transient behaviour requires compressor acceleration:
determining a desired operational condition of the compressor by determining a most suitable compressor map to improve the transient behaviour, the compressor map being associated with a specific inclination angle of the variable inlet guide vanes assembly moveable between a positive inclination angle and a negative inclination angle, the specific inclination angle being either the positive inclination angle, generating a pre-whirl in a same direction as the compressor, or the negative inclination angle, generating a pre-whirl in an opposite direction, and
controlling the position of the variable inlet guide vanes assembly based on the desired operational condition of the compressor by changing the inclination angle of the vanes such that the compressor map is applied, and
determining a current operational condition of the compressor indicative of a required compressor deceleration and controlling the position of the variable inlet guide vanes assembly based on the current operational condition of the compressor by determining an estimated negative inclination angle of the vanes of the variable inlet guide vanes assembly and changing the inclination of the vanes to the determined negative inclination angle.

* * * * *